United States Patent
Haapoja et al.

(10) Patent No.: US 7,609,171 B2
(45) Date of Patent: Oct. 27, 2009

(54) POWER CONSUMPTION CONTROL METHOD, POWER CONSUMPTION CONTROL APPARATUS, COMPUTER PROGRAM PRODUCT, COMPUTER PROGRAM DISTRIBUTION MEDIUM AND COMMUNICATION DEVICE

(75) Inventors: Sami Haapoja, Helsinki (FI); Niko Kiukkonen, Veikkola (FI)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 11/517,477

(22) Filed: Sep. 8, 2006

(65) Prior Publication Data

US 2008/0004063 A1 Jan. 3, 2008

(30) Foreign Application Priority Data

Jun. 29, 2006 (FI) ................................. 20065449

(51) Int. Cl.
*G08C 19/04* (2006.01)
(52) U.S. Cl. ............................... 340/870.39; 340/870.3; 455/574; 455/127.1; 455/127.5; 455/458; 455/343.4; 455/572; 713/320
(58) Field of Classification Search .............. 340/870.3, 340/870.39; 455/574, 127.1, 127.5, 458, 455/343.4, 572; 713/320
See application file for complete search history.

(56) References Cited

U.S. PATENT DOCUMENTS

| 6,889,055 B1 * | 5/2005 | Neufeld ...................... 455/458 |
| 6,965,763 B2 * | 11/2005 | Bussan et al. ............ 455/343.4 |
| 7,289,778 B2 * | 10/2007 | Sasaki ...................... 455/127.5 |
| 7,392,023 B2 * | 6/2008 | Grillo et al. .............. 455/127.1 |
| 7,400,642 B2 * | 7/2008 | Koo et al. .................... 370/447 |
| 2001/0011032 A1 | 8/2001 | Suzuki |
| 2004/0116161 A1 | 6/2004 | Grivas et al. |
| 2004/0127265 A1 * | 7/2004 | Van Bosch et al. .......... 455/574 |
| 2004/0198468 A1 * | 10/2004 | Patel et al. .................. 455/574 |
| 2005/0081073 A1 | 4/2005 | Williams |

FOREIGN PATENT DOCUMENTS

WO WO 2004/086736 10/2004

OTHER PUBLICATIONS

International Search Report PCT/FI2007/050387 filed Jun. 26, 2007.

* cited by examiner

*Primary Examiner*—Albert K Wong
(74) *Attorney, Agent, or Firm*—Squire, Sanders & Dempsey L.L.P.

(57) ABSTRACT

The invention relates to a power consumption control apparatus configured to receive messages or commands which have an increasing effect on power consumption of a communication device; monitor the power consumption of the communication device; and control the power consumption of the communication device by applying at least one predetermined power consumption limit in such a way that if the monitored power consumption reaches the at least one power consumption limit or if actions according to the received messages or commands will make the power consumption reach the at least one power consumption limit, the actions according to the received messages or commands are postponed.

22 Claims, 1 Drawing Sheet

Figure 1:
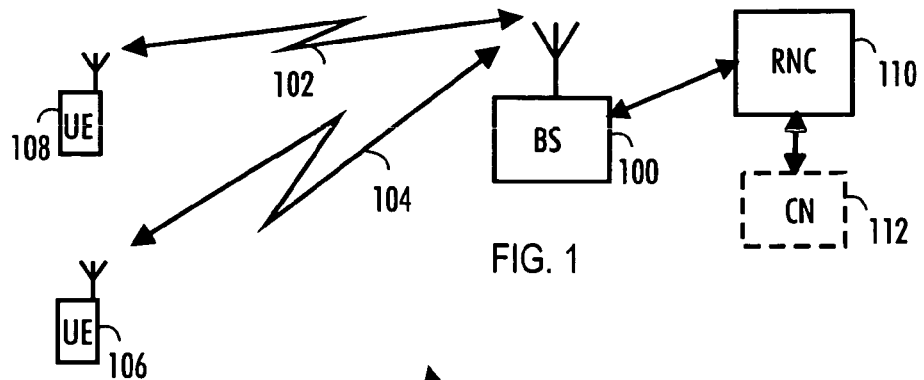

POWER CONSUMPTION CONTROL METHOD, POWER CONSUMPTION CONTROL APPARATUS, COMPUTER PROGRAM PRODUCT, COMPUTER PROGRAM DISTRIBUTION MEDIUM AND COMMUNICATION DEVICE

FIELD

The invention relates to a power consumption control method, power consumption control apparatus, computer program product, computer program distribution medium and communication device.

BACKGROUND

New radio technologies are emerging, and user devices in communications system are designed to be capable to use multiple radio systems, such as Global System for Mobile communication (GSM), Universal Mobile Telephone System (UMTS) and Personal Communications Services (PCS).

In addition to, new services and networks than the cellular radio systems have also been developed. Examples of such services are Wireless Local Area Network (WLAN) offering wireless access to the Internet, Global Positioning System (GPS) and Digital Video Broadcasting—Handheld (DVB-H) offering reception of digital television transmissions.

If a communication device supports more than one communications system, such as UMTS, or service protocols, such as DVB-H, the device can be called a multiradio device.

A problem arises if in a multiradio device, there is a plurality of simultaneous operations consuming a lot of power, because wireless apparatuses are typically battery-operated: the battery voltage level is usually monitored and if the battery voltage drops below a predetermined limit the multiradio device is switched off. Naturally, the switch-off terminates services used by a user, which is disruptive and inconvenient for the user.

BRIEF DESCRIPTION OF THE INVENTION

According to an aspect of the invention, there is provided a power consumption control method for a communication device, which communication device receives messages or commands which have an increasing effect on power consumption of the communication device, the method comprising: setting at least one limit for power consumption of the communication device; monitoring the power consumption of the communication device; and postponing actions according to the received messages or commands if the monitored power consumption reaches the at least one power consumption limit or if the actions according to the received messages or commands will make the power consumption reach the at least one power consumption limit.

According to another aspect of the invention, there is provided a power consumption control apparatus, configured to: receive messages or commands which have an increasing effect on power consumption of a communication device; monitor the power consumption of the communication device; and control the power consumption of the communication device by using at least one predetermined power consumption limit in such a way that if the monitored power consumption reaches the at least one power consumption limit or if actions according to the received messages or commands will make the power consumption reach the at least one power consumption limit, the actions according to the received messages or commands are postponed.

According to another aspect of the invention, there is provided a power consumption control apparatus, comprising: means for receiving messages or commands which have an increasing effect on power consumption of a communication device; means for monitoring the power consumption of the communication device; and means for controlling the power consumption of the communication device by applying at least one predetermined power consumption limit in such a way that if the monitored power consumption reaches the at least one power consumption limit or if actions according to the received messages or commands will make the power consumption reach the at least one power consumption limit, the actions according to the received messages or commands are postponed.

According to another aspect of the invention, there is provided a communication device, configured to: supply power from a power storage; receive messages or commands which have an increasing effect on power consumption of the communication device; monitor the power consumption of the communication device; and control the power consumption of the communication device by applying at least one predetermined power consumption limit in such a way that if the monitored power consumption reaches the at least one power consumption limit, or if actions according to the received messages or commands will make the power consumption reach the at least one power consumption limit, the actions according to the received messages or commands are postponed to prevent excessive use of the power storage.

According to another aspect of the invention, there is provided a computer program product encoding a computer program of instructions for executing a computer process for power consumption control, the process comprising: receiving messages or commands which have an increasing effect on power consumption of the communication device; monitoring the power consumption of the communication device; and controlling the power consumption of the communication device by applying at least one predetermined power consumption limit in such a way that if the monitored power consumption reaches the at least one power consumption limit or if actions according to the received messages or commands will make the power consumption reach the at least one power consumption limit, the actions according to the received messages or commands are postponed.

According to another aspect of the invention, there is provided a computer program distribution medium readable by a computer and encoding a computer program of instructions for executing a computer process for power consumption control, the process comprising: receiving messages or commands which have an increasing effect on power consumption of the communication device; monitoring the power consumption of the communication device; and controlling the power consumption of the communication device by using at least one predetermined power consumption limit in such a way that if the monitored power consumption reaches the at least one power consumption limit or if actions according to the received messages or commands will make the power consumption reach the at least one power consumption limit, the actions according to the received messages or commands are postponed.

The invention provides several advantages.

An embodiment of the invention provides an improvement in the usability and user experience of a multiradio device by smoothening peak power consumption an thereby improving battery efficiency. In addition to improved battery efficiency, an embodiment also provides improved means for a user device to be able to have several radios and/or applications active.

LIST OF DRAWINGS

Figure 3:
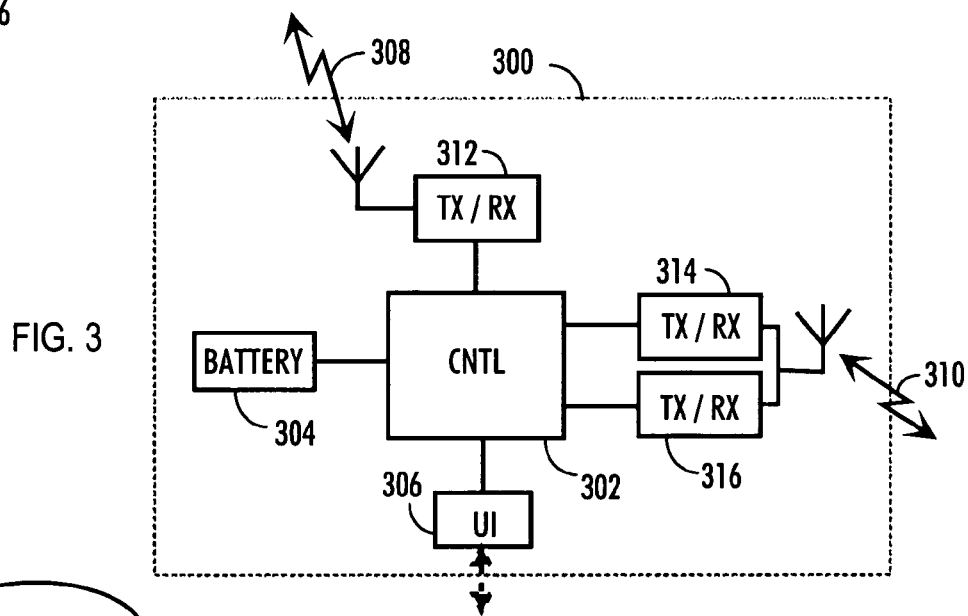
Figure 2:
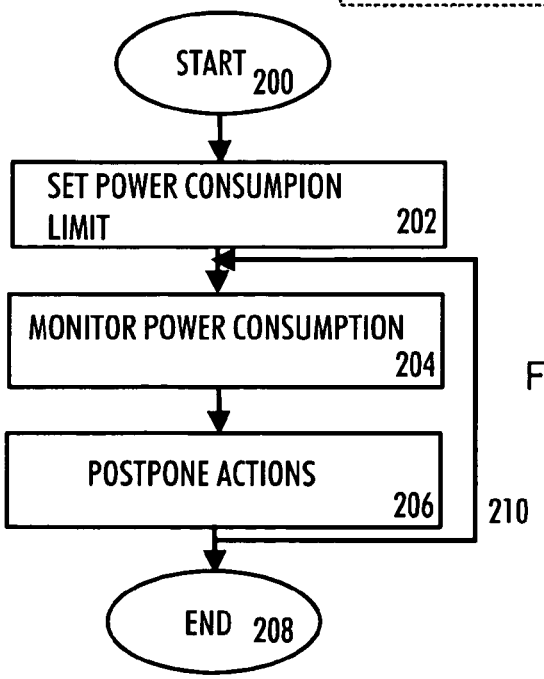

In the following, the invention will be described in greater detail with reference to the embodiments and the accompanying drawings, in which FIG. 1 shows an example of a communication system;
FIG. 2 is a flow chart; and
FIG. 3 illustrates a communication device.

DESCRIPTION OF EMBODIMENTS

There are many different radio protocols to be used in communications systems. Some examples of different communication systems are the Universal Mobile Telecommunications System (UMTS) radio access network (UTRAN), Global System for Mobile Communications (GSM) and its modifications, Wireless Local Area Network (WLAN), Worldwide Interoperability for Microwave Access (WiMAX), Bluetooth®, Personal Communications Services (PCS) and systems using ultra-wideband (UWB) technology.

FIG. 1 is a simplified illustration of a communications system to which embodiments according to the invention are applicable. FIG. 1 shows a part of a UMTS radio access network (UTRAN). UTRAN is a radio access network which includes wideband code division multiple access (WCDMA) technology.

The communications system is a cellular radio system which comprises a base station (or node B) 100, which has bi-directional radio links 102 and 104 to user devices 106 and 108. The user devices may be fixed, vehicle-mounted or portable. The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching centre (MSC), a media gateway (MGW) or a serving GPRS (general packet radio service) support node (SGSN), etc.

It should be noted that in future radio networks, the functionality of an RNC may be distributed among (possibly a subset of) base stations.

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

An embodiment of the invention provides a power consumption control method which is based on the fact that some portable terminal subsystems may momentarily use lots of power (peak-power) but the peak-power is needed only during a short period of time and, on the average, the subsystem consumes less power than the peak-power.

Such a subsystem is, for example, a Code Division Multiple Access (CDMA) radio transmitter. In a CDMA transmitter, the efficient power control minimizes the maximum transmit power as soon as it is possible from the point of view of a network environment. The embodiment is typically needed when there are more than one simultaneously active subsystems, which have large peak-powers, to avoid overlapping of peak-powers of subsystems in a time domain.

In practice, the embodiment may be implemented with a control entity in a communication device which is able to control the activities of subsystems according to predetermined priorities, and postpone operations of one subsystem, if another subsystem is operating at its peak-power or at a power close to it. The actual duration of postponing is considered to take only a short time and in most cases, it is practically invisible to the end user.

The control entity is typically aware of the battery voltage of the user device and controls the activities of the high power subsystems only when the remaining battery capacity is low.

Next, an embodiment of a power consumption control method is explained in further detail by means of FIG. 2. The embodiment relates mainly to power consumption control of communication devices having a plurality of simultaneous operations, such as a CDMA (code division multiple access) connection and a WLAN connection, consuming high battery currents, when their transmitters are active and close to maximum power level. The embodiment practically focuses on improving battery life of a communication device by adjusting mutual transmit time of a plurality of simultaneously active radio connections based on their power level information.

A CDMA-2000 transmitter, for example, typically consumes 1A of current when operating close to the maximum output power levels. If another application consuming a lot of battery current is used simultaneously, a significant voltage drop may occur due to residual resistances in battery and power supply lines between battery and power consuming subsystems. Battery voltage level is typically monitored continuously, and if the battery voltage drops below a predetermined limit, the communication device is switched off, which, of course, is annoying for a user.

The embodiment utilizes statistical characteristics of transmission power distribution of a radio connection, such as a CDMA connection. The transmission power of a communication device depends, for example, on network density, signal propagation and device location, i.e., whether the device is in a radio wave shadow or in a strong radio field, for example. Since in CDMA, one of the shared resources (in addition to time and frequency) is power, power control concepts are used to optimize the transmit power of user devices and base stations.

It is known, and also easily noticeable from transmit power probability density function profiles in different environments that a CDMA communications device rarely uses maximum output power levels. Moreover, the maximum output power levels are typically used for a short time.

Due to the statistical characters described above, it is possible to limit a peak-power and thus improve battery usage time of a communication device by postponing for a short while the service of a simultaneous radio connection. Once the employed power is again at a lower level that is below a predetermined threshold or limit, the required additional services may be acknowledged.

The duration of waiting for the service depends on the limit set for the power level: the higher the limit, the shorter the delay in access granting for additional services. One target in setting the limit is to keep the delay short enough so that it remains unnoticeable to a user. On the other hand, the selected limit should be low enough to prevent shut-downs of the communication device. The limit for power consumption may be adaptive, in which case remaining battery capacity and current or power consumption are checked and service needs are monitored for setting the limit A starting moment adjustment (postponing) of a new power consuming service may be based on a power consumption limit and a probability of exceeding the defined limit. Since there is a certain probability of exceeding the power consumption limit and a certain probability regarding a typical duration of the exceeding, probability information can be utilized when an access delay for a new service due to power consumption limitations is calculated. If the delay is too long to provide an adequate service quality, the starting moment of the new service can be postponed until a previously started service ends, the limit is changed, or power consumption level of the previously started service is low enough.

The embodiment starts in block 200. In the embodiment, messages or commands are received which have an increasing effect on the power consumption of a communication device. There are several different kinds of messages or commands which may increase the power consumption of a communication device.

A network, mainly a base station, typically sends commands regarding transmission power level of a communication device: for instance, if a base station receives a power level which is too low, it sends a command to the communication device to increase transmission power. The network may also send commands for launching new services: for instance, when a communication device has requested for a new service, the network sends an acknowledgement message.

In block 202, at least one limit is set for power consumption of a communication device. There may be a short-term limit for allowed peak current and/or a longer-term limit which takes into consideration phenomena that have a long term influence on the current consumption, such as heating or specific absorption rate (SAR). In practice, typically both limits constitute one power consumption limit.

It is known, that a CDMA communications device uses maximum output power levels rarely. On the other hand, the usage of the maximum output power levels is typically short term. These characters may be used in setting a limit for power consumption.

Power consumption limits may be obtained from practical experience or by power consumption simulations.

In block 204, the power consumption of the communication device is monitored.

Usually, transmission power level of a communication device is known a priori, since, for example, a network sends commands to the communication device for future power levels: for instance, if a base station receives a power level which is too low, it sends a command to the communication device to increase transmission power. Also future service needs are typically known in the communication device sometime before the service is build up.

A communication device may have an entity which checks current (or power) consumption of the communication device periodically or according to a command, and/or an entity which maintains a list of active systems and applications and their power consumption statuses.

The entity may compare the transmission power level of a next transmission slot to a predetermined power consumption limit.

In block 206, actions according to the received messages or commands are postponed if the monitored power consumption has reached the at least one power consumption limit or if actions according to the received messages or commands will make the power consumption reach the at least one power consumption limit.

The entity may deny, for instance, transmission and/or reception of an additional radio service, if the power consumption limit is exceeded. The transmission and/or reception will be allowed when the power level is again at a lower level that is below the predetermined power consumption limit. If the power level remains too high for a predetermined period of time, it is possible to decide that the radio service will not be provided and a message informing of a denied access will be sent to a network and/or to a user.

The embodiment ends in block 208. The embodiment is typically repeated every time a command or message is received which may increase power consumption of the device. One possibility for repeating is depicted by arrow 210.

The embodiments of the invention may be implemented as a computer program comprising instructions for executing a computer process for power consumption control.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Other than computer program implementations are also possible, for example different hardware implementations (modules or apparatuses), e.g. a circuit built of separate logics components or one or more client-specific integrated circuits (Application-Specific Integrated Circuit, ASIC). A hybrid of these implementations is also feasible (modules or apparatuses).

Next, a structure of a communication device providing support for a plurality of different radio protocols will be described with reference to the simplified example of FIG. 3. The embodiments are not, however, restricted to the device given as an example but a person skilled in the art may apply the solution to other devices provided with the necessary properties.

The communication device may be a mobile phone, a computer, a laptop, or a PDA (Personal Digital Assistant). The communication device typically is a user device. It should be noticed that the communication device may also include characteristics of several devices, such as a computer capable of offering wireless data or speech transfer services.

The communication device of the example includes a plurality of communication interfaces 312 to 316 to provide wireless radio connections 308, 310 to other devices, such as base stations. The communication interfaces typically include at least one transceiver. The communication interfaces 312 to 316 usually provide connections employing different radio access technologies. It is obvious for a person skilled in the art that the number of communication interfaces may vary from one implementation to another.

The communication device of the example further includes a control unit 302 to control functions of the device 300. The control unit 302 comprises means for creating radio connections between the communication device 300 and other communication devices or networks. The control unit 302 also comprises means for controlling a number of simultaneous radio connections in the communication device. The control unit may be configured to perform at least partly embodiments of the controlling method described above. For instance, the control unit of the example receives messages or commands which have an increasing effect on the power consumption of the communication device, monitors the power consumption of the communication device and postpones actions according to the received messages or commands, if the monitored power consumption reaches a consumption limit or if actions according to the received messages or commands will make the power consumption to reach the at least one power consumption limit.

The control unit 302 may include a digital signal processor provided with suitable software or with separate logic circuits, such as ASIC (Application Specific Integrated Circuit). The control unit 302 may also be a combination of these two implementations, such as a processor with suitable software embedded within an ASIC.

The communication device typically comprises a battery 304 for power supply.

The communication device 300 further comprises a user interface 306 connected to the controlling unit. The user interface 306 may comprise a keyboard, a microphone, a loudspeaker, a display, and/or a camera.

It is obvious to a person skilled in the art that the communication device may include parts not depicted in FIG. 3.

Even though the invention has been described above with reference to an example according to the accompanying drawings, it is clear that the invention is not restricted thereto but it can be modified in several ways within the scope of the appended claims.

The invention claimed is:

1. A method, comprising:
    setting at least one power consumption limit of a communication device, wherein the communication device receives messages or commands which have an increasing effect on power consumption of the communication device;
    monitoring the power consumption of the communication device; and
    postponing actions according to the received messages or commands if the monitored power consumption reaches the at least one power consumption limit or if the actions according to the received messages or commands will make the power consumption reach the at least one power consumption limit.

2. The method of claim 1, further comprising:
    configuring the at least one power consumption limit to be adaptive, and the setting of the at least one power consumption limit comprising
        checking remaining battery capacity;
        checking current or power consumption; and
        monitoring service needs.

3. The method of claim 1, further comprising:
    configuring the at least one power consumption limit to be adaptive, and the setting of the adaptive limit comprising utilizing transmit power probability function profiles.

4. The method of claim 1, further comprising:
    configuring the at least one power consumption limit to comprise a short-term limit for allowed peak current and a longer-term limit.

5. The method of claim 1, further comprising:
    configuring the at least one power consumption limit to comprise a short-term limit for allowed peak current or a longer-term limit.

6. The method of claim 1, further comprising:
    carrying out the monitoring by checking power or current consumption of the communication device or by maintaining a list of active systems and applications and associated power consumption statuses.

7. The method of claim 1, further comprising:
    carrying out the monitoring by checking power or current consumption of the communication device and by maintaining a list of active systems and applications and associated power consumption statuses.

8. An apparatus, comprising:
    a receiver configured to receive messages or commands which have an increasing effect on power consumption of a communication device; and
    a processor configured to monitor the power consumption of the communication device and to control the power consumption of the communication device by using at least one predetermined power consumption limit in such a way that if the monitored power consumption reaches the at least one power consumption limit or if actions according to the received messages or commands make the power consumption reach the at least one power consumption limit, the actions according to the received messages or commands are postponed.

9. The apparatus of claim 8, wherein the at least one limit for power consumption comprises a short-term limit and a longer-term limit for allowed peak current.

10. The apparatus of claim 8, wherein the at least one limit for power consumption comprises a short-term limit or a longer-term limit for allowed peak current.

11. The apparatus of claim 8, wherein the processor is further configured to carry out the monitoring of the power consumption of the communication device by checking power or current consumption of the communication device or by maintaining a list of active systems and applications and associated power consumption statuses.

12. The apparatus of claim 8, wherein the processor is further configured to carry out the monitoring of the power consumption of the communication device by checking power or current consumption of the communication device and by maintaining a list of active systems and applications and associated power consumption statuses.

13. An apparatus, comprising:
    means for receiving messages or commands which have an increasing effect on power consumption of a communication device;
    means for monitoring the power consumption of the communication device; and
    means for controlling the power consumption of the communication device by applying at least one predetermined power consumption limit in such a way that if the monitored power consumption reaches the at least one power consumption limit or if actions according to the received messages or commands make the power consumption reach the at least one power consumption limit, the actions according to the received messages or commands are postponed.

14. An apparatus, comprising:
    a power supply configured to supply power from a power storage;
    a receiver configured to receive messages or commands which have an increasing effect on power consumption of the apparatus; and
    a processor configured to monitor the power consumption of the apparatus and to control the power consumption of the apparatus by applying at least one predetermined power consumption limit in such a way that if the monitored power consumption reaches the at least one power consumption limit, or if actions according to the received messages or commands make the power consumption reach the at least one power consumption limit, the actions according to the received messages or commands are postponed to prevent excessive use of the power storage.

15. The apparatus of claim 14, wherein the at least one limit for power consumption comprises a short-term limit and a longer-term limit for allowed peak current.

16. The apparatus of claim 14, wherein the at least one limit for power consumption comprises a short-term limit or a longer-term limit for allowed peak current.

17. The apparatus of claim 14, wherein the processor is further configured to carry out the monitoring of the power consumption of the apparatus by checking power or current consumption of the apparatus or by maintaining a list of active systems and applications and associated power consumption statuses.

18. The apparatus of claim 14, wherein the processor is further configured to carry out the monitoring of the power consumption of the apparatus by checking power or current consumption of the apparatus and by maintaining a list of active systems and applications and associated power consumption statuses.

19. A computer-readable storage medium encoded with instructions configured to control a processor to perform a process, the process comprising:
    receiving messages or commands which have an increasing effect on power consumption of a communication device;
    monitoring the power consumption of the communication device; and
    controlling the power consumption of the communication device by applying at least one predetermined power consumption limit in such a way that if the monitored power consumption reaches the at least one power consumption limit or if actions according to the received messages or commands make the power consumption reach the at least one power consumption limit, the actions according to the received messages or commands are postponed.

20. The computer-readable storage medium of claim 19, further comprising:
    carrying out the monitoring by checking the power or current consumption of the communication device or by maintaining a list of active systems and applications and associated power consumption statuses.

21. The computer-readable storage medium of claim 19, further comprising:
    carrying out the monitoring by checking the power or current consumption of the communication device and by maintaining a list of active systems and applications and associated power consumption statuses.

22. An apparatus, comprising:
    means for supplying power from a power storage;
    means for receiving messages or commands which have an increasing effect on power consumption of the apparatus;
    means for monitoring the power consumption of the apparatus; and
    means for controlling the power consumption of the apparatus by applying at least one predetermined power consumption limit in such a way that if the monitored power consumption reaches the at least one power consumption limit, or if actions according to the received messages or commands make the power consumption reach the at least one power consumption limit, the actions according to the received messages or commands are postponed to prevent excessive use of the power storage.

* * * * *